United States Patent
Govindaraj et al.

(10) Patent No.: US 11,774,545 B2
(45) Date of Patent: Oct. 3, 2023

(54) METHOD FOR CREATING AN OBJECT MAP FOR A FACTORY ENVIRONMENT

(71) Applicant: Robert Bosch GmbH, Stuttgart (DE)

(72) Inventors: Keerthana Govindaraj, Leonberg (DE); Tobias Hiller, Weil im Schoenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 608 days.

(21) Appl. No.: 16/634,700

(22) PCT Filed: Jul. 23, 2018

(86) PCT No.: PCT/EP2018/069919
§ 371 (c)(1),
(2) Date: Jan. 28, 2020

(87) PCT Pub. No.: WO2019/025221
PCT Pub. Date: Feb. 7, 2019

(65) Prior Publication Data
US 2020/0198141 A1 Jun. 25, 2020

(30) Foreign Application Priority Data
Aug. 4, 2017 (DE) ................... 10 2017 213 601.4

(51) Int. Cl.
| | | |
|---|---|---|
| *B25J 9/16* | (2006.01) | |
| *G01C 21/20* | (2006.01) | |
| *G01S 17/89* | (2020.01) | |
| *G05D 1/02* | (2020.01) | |
| *G06K 9/00* | (2022.01) | |
| *G01S 5/02* | (2010.01) | |
| *G06V 20/10* | (2022.01) | |
| *G01S 17/86* | (2020.01) | |

(52) U.S. Cl.
CPC ......... *G01S 5/02521* (2020.05); *B25J 9/1676* (2013.01); *G01C 21/206* (2013.01);
(Continued)

(58) Field of Classification Search
CPC ..... B25J 9/1676; B25J 9/1674; G01C 21/206; G01C 21/383; G01S 17/89; G01S 17/86;
(Continued)

(56) References Cited

U.S. PATENT DOCUMENTS

2010/0049366 A1* 2/2010 Lee .................. G05D 1/0274
700/258
2010/0274481 A1* 10/2010 Krishnaswamy ...... G01C 21/28
701/532
(Continued)

FOREIGN PATENT DOCUMENTS

| CN | 104385287 A | 3/2015 | |
|---|---|---|---|
| JP | 5439552 B2 * | 3/2014 | ............. G05D 1/024 |
| JP | 2014228637 A * | 12/2014 | |

OTHER PUBLICATIONS

Machine Translation: JP-5439552-B2 (year:2014).*
(Continued)

*Primary Examiner* — Anne Marie Antonucci
*Assistant Examiner* — Connor L Knight
(74) *Attorney, Agent, or Firm* — Maginot, Moore & Beck LLP

(57) ABSTRACT

The disclosure relates to a method for creating an object map for a factory environment by using sensors present in the factory environment, wherein at least one part of an object in the factory environment has information relating to its position recorded by at least two of the sensors, wherein the information recorded by the sensors is transmitted to a server associated with the sensors, and wherein the server is used to take the information recorded and transmitted by the sensors as a basis for creating an object map for the factory environment having a position of the at least one part of the object.

12 Claims, 4 Drawing Sheets

(52) U.S. Cl.
CPC ............ *G01S 17/89* (2013.01); *G05D 1/0214* (2013.01); *G06V 20/10* (2022.01); *G01S 17/86* (2020.01); *G06V 2201/06* (2022.01)

(58) Field of Classification Search
CPC .... G01S 5/0252; G05D 1/0214; G06V 20/10; G06V 2201/06; G05B 2219/40323
See application file for complete search history.

(56) References Cited

U.S. PATENT DOCUMENTS

| | | |
|---|---|---|
| 2014/0316636 A1 | 10/2014 | Hong et al. |
| 2015/0086084 A1* | 3/2015 | Falconer ................ G06V 20/10 382/113 |
| 2016/0189348 A1* | 6/2016 | Canter .................... G06T 19/20 382/154 |
| 2020/0109954 A1* | 4/2020 | Li ........................ G05D 1/0278 |

OTHER PUBLICATIONS

Machine Translation: JP-2014228637-A (Year: 2014).*
International Search Report corresponding to PCT Application No. PCT/EP2018/069919, dated Oct. 24, 2018 (German and English language document) (5 pages).
C. Ramer; J. Sessner; M. Scholz; X. Zhang; and J. Franke; Fusing Low-cost Sensor Data for Localization and Mapping of Automated Guided Vehicle Fleets in Indoor Applications; 2015 IEEE International Conference on Multisensor Fusion and Integration for Intelligent Systems (MFI); Sep. 14-16, 2015, San Diego, CA, USA.

* cited by examiner

METHOD FOR CREATING AN OBJECT MAP FOR A FACTORY ENVIRONMENT

This application is a 35 U.S.C. § 371 National Stage Application of PCT/EP2018/069919, filed on Jul. 23, 2018, which claims the benefit of priority to Serial No. DE 10 2017 213 601.4, filed on Aug. 4, 2017 in Germany, the disclosures of which are incorporated herein by reference in their entirety.

The present disclosure relates to a method for creating an object map for a factory environment, such as a factory hall, by using sensors present in the factory environment.

BACKGROUND

Today, increasing numbers of processes are automated in modern factory environments, such as, for example, factory halls or assembly halls and the like. Robots and automated vehicles, for example, are used for this purpose. This is also known by the term "Industry 4.0". Despite the automation, it remains necessary for people also to move around in the factory and work or interwork with the devices present there, i.e., for example, robots also.

For this purpose, it is desirable to obtain information which is as precise as possible regarding the position of individual objects, including, in particular, automated devices such as robots or vehicles, but also persons. It is also intended to be possible to monitor partial objects and their positions, such as the arm of a robot or the silhouette of a person. This is important not least for enabling safe operation for the persons. Product flow and material flow in a factory could furthermore also be monitored in this way.

It is possible to determine the exact position of objects by using sensors such as GPS (but only outdoors), WLAN units, LIDARs, cameras and the like. It is known, for example, from CN 104 385 282 A to combine the information from a plurality of sensors. It is also known from "C. Ramer, J. Sessner, M. Scholz, X. Zhang and J. Franke, "Fusing low-cost sensor data for localization and mapping of automated guided vehicle fleets in indoor applications," Multisensor Fusion and Integration for Intelligent Systems (MFI) 2015 IEEE International Conference on, San Diego, Calif., 2015, pp. 65-70" to combine the information from different types of sensors. However, the latency times that are present are still problematic here.

SUMMARY

A method and a system are proposed according to the disclosure. Advantageous designs form the subject-matter of the embodiments and the following description.

A method according to the disclosure serves to create an object map for a factory environment by using sensors present in the factory environment. A factory hall or assembly hall, in particular, can be considered as a factory environment. Information relating to the position of at least one part of an object in the factory environment is recorded by at least two of the sensors. It is also conceivable, in particular, for at least one object (or part thereof) in the factory environment to be recorded in each case by each of the sensors. Objects are to be understood here to mean, in particular, automated devices such as robots or vehicles, but also persons, while partial objects are understood to mean, for example, the arm of a robot or the silhouette of a person. Products or material and their conditions, for example in a factory, are also understood to be included herein. The information recorded by the sensors is then transmitted to a server assigned to the sensors and an object map is created for the factory environment with the position of the at least one part of the object by using the server on the basis of the information recorded and transmitted by the sensors. The object map can, in particular, be created by the server, i.e., for example, by suitable software running thereon. A server of this type appropriately has at least one processor, a memory, and a network connection for this purpose. The sensors can preferably be connected wirelessly to the server. However, depending on the type of the sensor, a wired connection would also be conceivable. An edge server in particular, i.e. a very powerful server, can be considered as a server of this type. This procedure can also preferably be repeated continuously or at least at certain time intervals, in particular based on the previous map information as a reference, i.e. the object map can be updated. In this way, only information such as, in particular, a distance of an object or a part thereof must be recorded by the individual sensors and transmitted to the server. Information is then appropriately processed only in or on the server, or at least by using the server. This therefore enables a particularly fast and efficient processing of information and correspondingly therefore a fast and efficient creation of the object map, since the sensors are connected directly to the high-performance (edge) server. Since information relating to the position of at least one part of an object in the factory environment is recorded by at least two of the sensors, a particularly precise position can be determined at least in relation to this at least one object or a part thereof. It can be taken into account here that different sensors can, for example, have different angles of view toward an object or that different sensors can use different types of distance measurement. In this way, a correction of the position as it would be determined by one of the sensors is then possible. It should be noted in this respect that information relating to the respective position can also be recorded in each case by two or more different sensors for each of a multiplicity of objects or parts thereof. On the whole, an object map with very precise positions of a multiplicity of objects or parts thereof in the factory environment, where possible even of all (relevant) objects, can therefore be created.

The object map is preferably transmitted to at least one device present in the factory environment. The device can then be controlled there, for example, by using the object map.

At least one device present in the factory environment is advantageously controlled on the basis of the object map. An actuator (or a plurality of actuators) can then appropriately be controlled there. In particular, the object map can be transmitted onto the device for this purpose. The control of a robot, for example, on the basis of the object map containing the precise position of the person is therefore conceivable. In this way, it can be ensured, for example, that the robot, or a different device, is controlled only if persons maintain an adequate safety distance. A specific or adapted control of the device is similarly possible depending on the position of the person.

It is particularly preferred if a partial object map is created by the server for the factory environment based on the information recorded and transmitted by the sensors. Information recorded by at least one further of the sensors (or two or more of the sensors) can then be transmitted to a further server assigned to the at least one further sensor. A further partial object map can then be created for the factory environment by the further server based on the information recorded and transmitted by the at least one further sensor, wherein the object map can then be created for the factory environment from the partial object map and the further partial object map with the position of the at least one part of the object. In this way, the creation of the object map can therefore be divided among at least two or more servers which then receive information in each case from only some of the sensors in order to create a partial object map, i.e., in particular, for only a part of the factory environment also. Larger factory environments, for example, can thus be covered in a very simple manner. Not only two servers in total, but also three, four or even more servers of this type can obviously be used, by means of which separate partial object maps of this type can in each case be created and can then be combined into an object map.

Whereas, in the case mentioned, an object or a part thereof does not necessarily also have to be recorded initially by the further sensor, or information relating to a position of an object does not have to be recorded (there could also be no object within the range of the further sensor), it is nevertheless preferred if the information recorded by the at least one further of the sensors also comprises information relating to a position of at least one part of a further object in the factory environment. The object map can then be created for the factory environment from the partial object map with the position of the at least one part of the object and the at least one part of the further object.

It is advantageous if the partial object maps (i.e. the partial object map and the further partial object map, depending on the situation also more than two partial object maps) are transmitted by the respective server to a higher-order server, wherein the object map is created by the higher-order server. The individual partial object maps can therefore be combined on the higher-order server. It is also conceivable for the partial object maps to overlap one another partially and for an overlap of this type to be taken into account or removed when the object map is created.

The information recorded by the sensors assigned to the server preferably comprises information for a first area and a second area which is further removed from a reference than the first area. The corresponding server, but also a specific point in the factory environment or a specific device such as a robot in the factory environment, can serve as a reference. Only information for the second area and/or the partial object map only with positions of objects or parts thereof in the factory environment determined from the information for the second area is then transmitted directly or indirectly to the further server. In the case of indirect transmission, only the information or positions of objects or parts thereof (or a correspondingly created object map) relevant to a specific server is/are transmitted by the higher-order server to this server. It is thus possible that only the actually required information is forwarded to a server, on the basis of which a control of a device, for example, is then possible. A person, for example, located close to a robot is thus relevant only to the corresponding server to which the sensors close to the robot are assigned. Conversely, a person moving away from a robot or moving elsewhere is, for example, also relevant to a different server close to which a different robot is provided. This person could in fact be moving toward this robot. The information can be forwarded in this way from one server to another server according to relevance. It is furthermore conceivable for a third area (or even more areas) to be used, so that information having differing relevance can be exchanged over differing distances, i.e. with differing numbers of servers or servers located at differing distances.

The sensors are preferably selected at least partially from the following sensors: cameras, in particular video cameras and stereo cameras, ultrasound sensors, microphones, proximity sensors, RADAR units, LIDAR units, radio modules, in particular WLAN units and Bluetooth units, inertial sensors and distance sensors. All of these sensors are commonly found, particularly in factory environments, and can be used in order to collect as much information as possible relating to the position of objects or parts thereof in the factory environment.

It is also appropriate for the sensors to be selected at least partially from sensors which are disposed on objects and/or devices in the factory environment. Not only separately disposed sensors, but also sensors on, for example, devices moved manually or automatically (for example robots) or vehicles (for example forklift trucks), can thus be used. Sensors on augmented-reality glasses or augmented-reality helmets which are used, for example, by persons in the factory environment to carry out guided assembly work or the like are also conceivable.

In addition to position information, further location-related and object-related information can also be generated and compared. Examples include information relating to work progress, the applicable safety level, the information applicable to an object (e.g. operating instructions for the machinery in front of which a worker is currently standing or which he is observing) or warning messages to persons.

The map created on the server further offers the facility to use information, for example in the form of a mobility pattern, if, for example, areas covered by two servers do not overlap one another, in order to estimate, for example, distance, average speed, etc., between the areas. This further increases safety given that an entry into the second area can be expected with high probability.

In order to guarantee a harmonization of the maps of the individual servers, a higher-order edge server can receive the map information from each server in the hierarchy below and can coordinate and merge the information.

A system according to the disclosure having at least one server and having sensors is configured, particularly in terms of program technology, to carry out a method according to the disclosure.

The implementation of the method in the form of a computer program is also advantageous since this incurs particularly low costs, particularly if an executing control unit is used for further tasks also and is therefore already present. Suitable data media for providing the computer program are, in particular, magnetic, optical and electrical memories, such as e.g. hard disks, flash memories, EEPROMs, DVDs, etc. A download of a program via computer networks (Internet, Intranet, etc.) is also possible.

Further advantages and designs of the disclosure can be found in the description and the attached drawing.

The features mentioned above and still to be explained below are obviously usable not only in the respectively indicated combination, but also in other combinations or in isolation without departing the scope of the present disclosure.

The disclosure is shown schematically in the drawing on the basis of example embodiments and is described in detail below with reference to the drawing.

DETAILED DESCRIPTION

Figure 1:
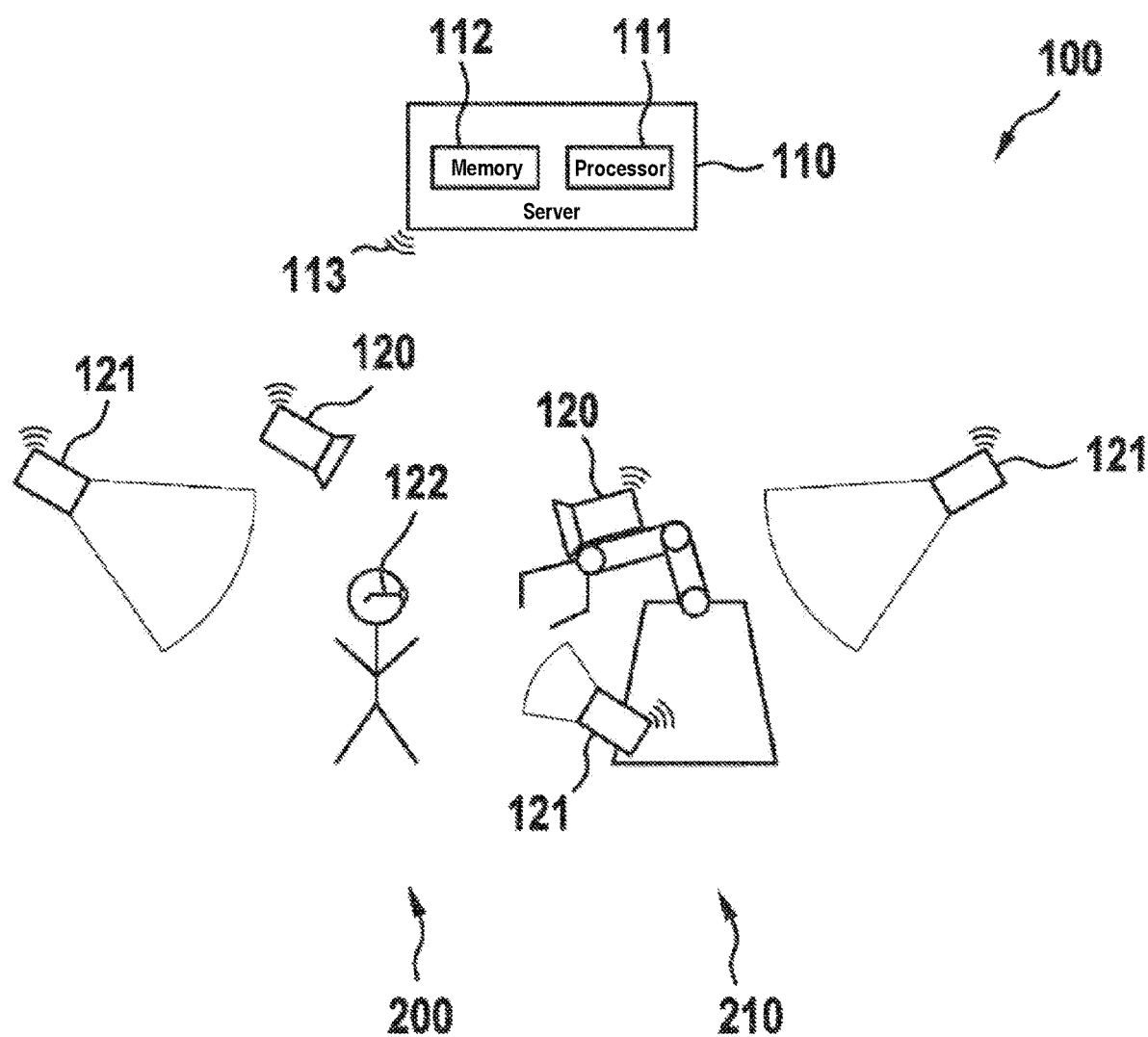
FIG. 1 shows schematically a factory environment with a system according to the disclosure in a preferred embodiment with which a method according to the disclosure can be carried out.

FIG. 1 shows schematically a factory environment 100 with a system according to the disclosure in a preferred embodiment with which a method according to the disclosure can be carried out. The factory environment may, for example, be a factory hall. The system comprises a server 110 and, by way of example, different sensors 120, 121 and 122.

The server 110 here has a processor 111 and a memory 112, and also a network connection 113, here in the form of a radio module, in particular WLAN or Wi-Fi. The sensors denoted 120 here are, by way of example, cameras, the sensors denoted 121 are LIDARs and the sensor denoted 122 is a sensor on augmented-reality glasses, which can also include a camera.

A person 200 wearing the augmented-reality glasses, and also a device 210 designed as an automated robot, are now further shown as objects in the factory environment 100. Some of the aforementioned sensors are also disposed on the robot 210.

The individual sensors can now record information relating to the position of the person 200 and of the robot 210 in the factory environment 100 and can transmit said information to the server 110.

Figure 2:
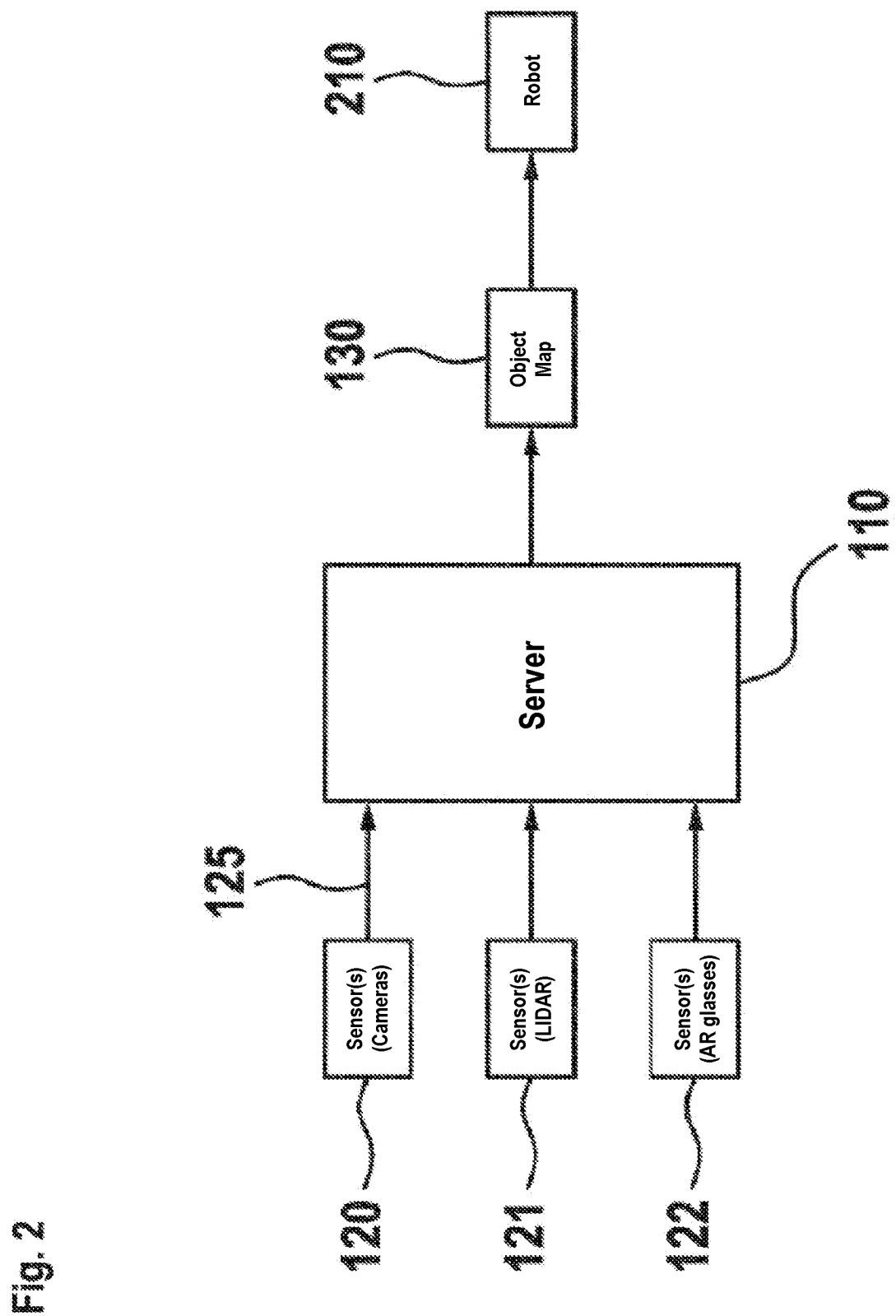
FIG. 2 shows schematically a process of a method according to the disclosure in a preferred embodiment.

FIG. 2 shows schematically a process of a method according to the disclosure in a preferred embodiment. The individual sensors 120, 121 and 122 can now record information 125 relating to the position of the objects, i.e., for example, the person 200 and the robot 210 according to FIG. 1, in the factory environment 100 and can transmit said information to the server 110. Information can be recorded by both the person 200 and the robot 210 in respect of their position, in each case by using a plurality of different sensors.

An object map 130 containing the positions of the person 200 and of the robot 210 in the factory environment 100 can now be created on the server 110 from the received information 125. It is conceivable for the object map 130 to contain not only one individual position indication of an object, but also to contain more detailed position information, such as, for example, the position of a robot arm. As mentioned, particularly precise positions can be determined on the basis of the information relating to a position of objects in each case from a plurality of different sensors.

The object map 130 can then be transmitted, for example, to the robot 210 so that the latter, or one or more actuators thereof, can be controlled. The present position of the person 200 can therefore be taken into consideration when controlling the robot 210. Dangerous situations can be avoided in this way since, for example, the robot 210 can be stopped if the person 200 comes too close to the robot 210. This process of creating the object map can be repeated continuously, so that up-to-date data relating to the positions of individual objects in the factory environment are constantly available.

Figure 3:
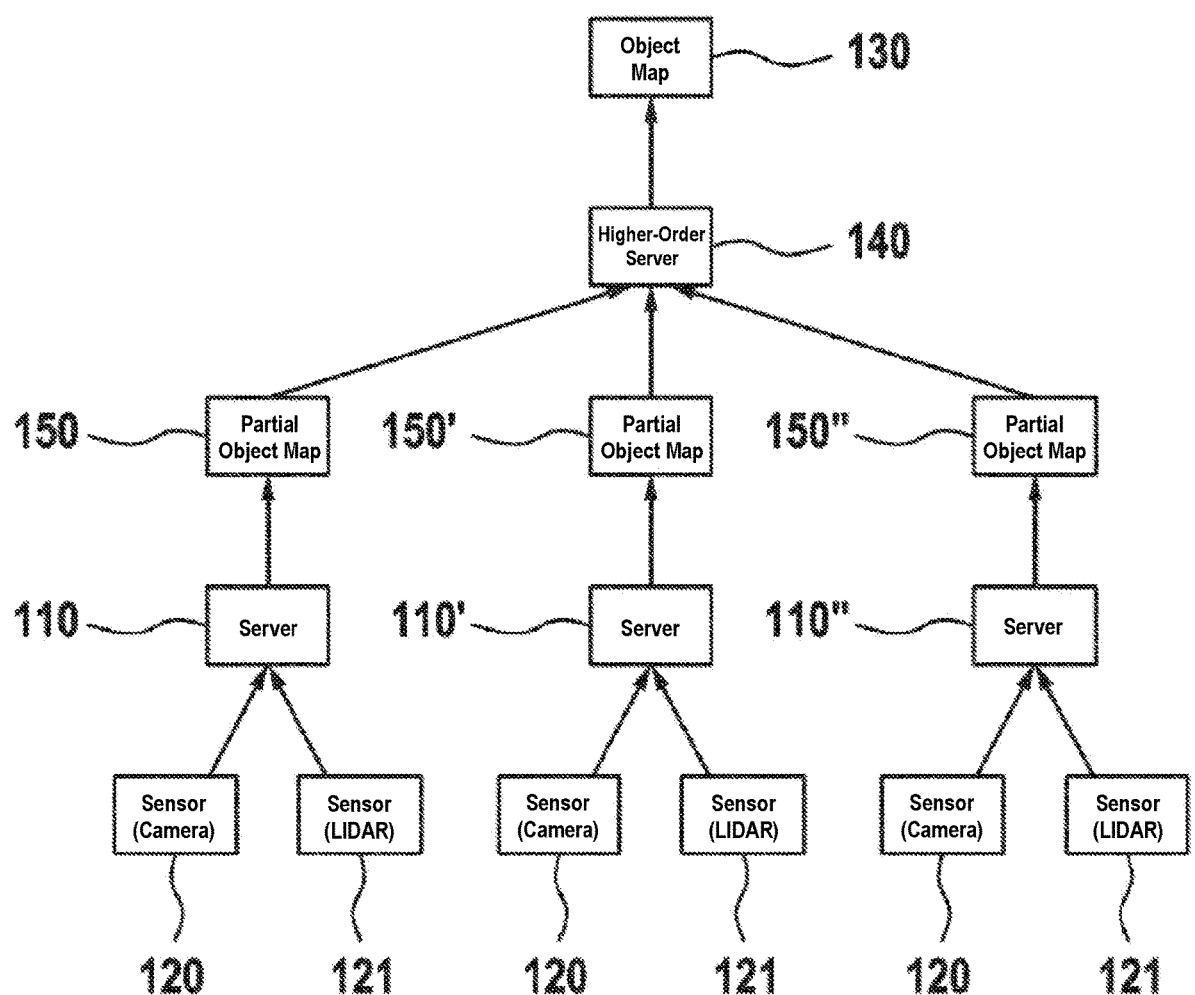
FIG. 3 shows schematically a system according to the disclosure in a further preferred embodiment.

FIG. 3 now shows schematically a system according to the disclosure in a further preferred embodiment. The server 110 is again shown for this purpose, here by way of example only with sensors 120 and 121 which are assigned to the server 110.

Moreover, two further servers 110' and 110" are shown to which, by way of example, sensors 120 and 121 are in each case similarly assigned. Each of the sensors can now transmit information recorded by it, particularly relating to positions of objects, to the server assigned to it. A partial object map 150, 150' and 150" can then be created in each case by means of the servers 110, 110' and 110" and can in turn be transmitted to a higher-order server 140. The higher-order server 140 can be designed per se as identical to the other servers. The object map 130 can then be compiled there from the individual partial object maps.

Figure 4:
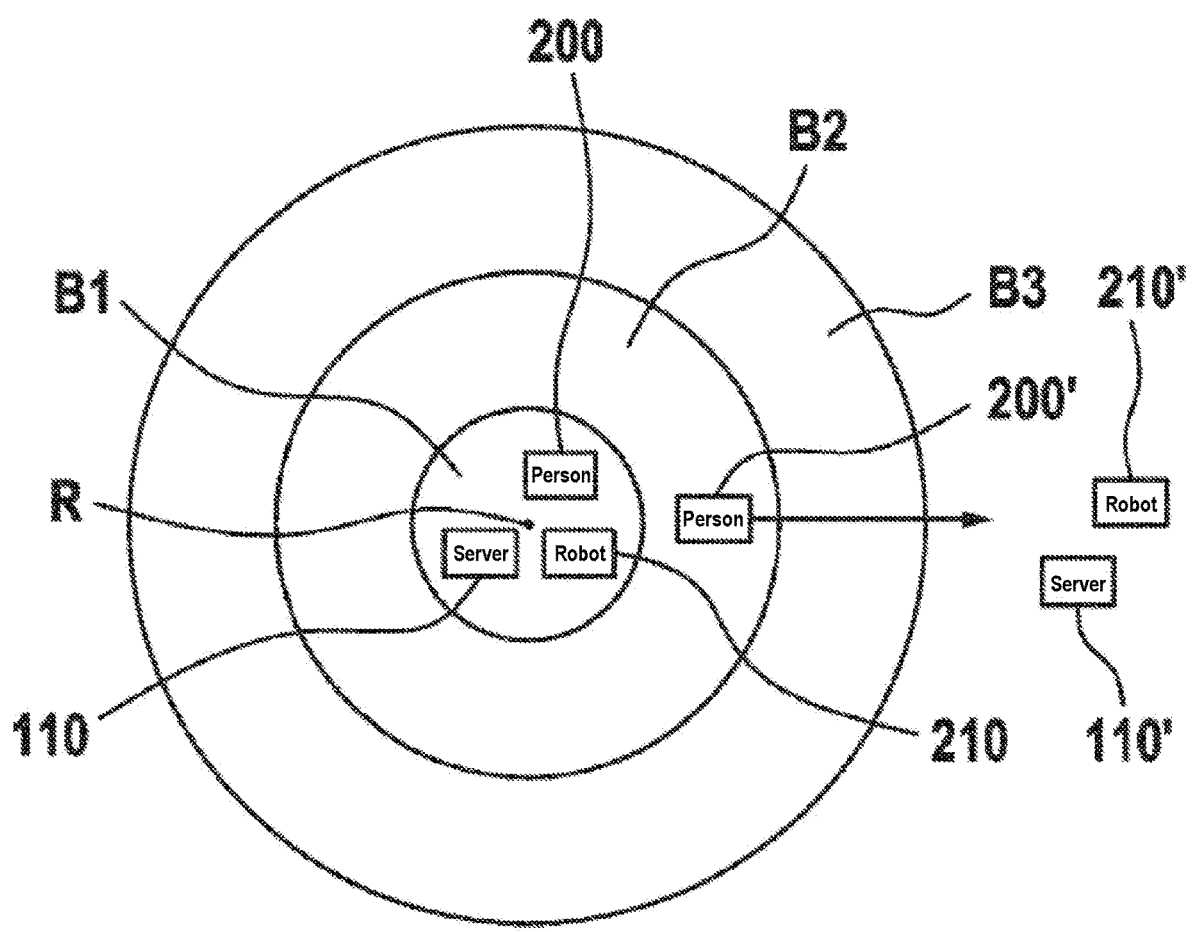
FIG. 4 shows schematically different areas for carrying out a method according to the disclosure in a further preferred embodiment.

FIG. 4 shows schematically different areas $B_1$, $B_2$ and $B_3$ for carrying out a method according to the disclosure in a further preferred embodiment. A reference R which can be specified, for example, depending on the robot 210 is defined here close to the server 110.

By way of example, a first area $B_1$, an area $B_2$ further removed from the reference R and an area B3 still further removed from the reference R are specified in relation to the reference R. The areas are designed here by way of example as circular. If, for example, the person 200 is recorded in the first area $B_1$ and therefore close to the robot 210, this information is initially relevant to the server 110 only. This information or an associated position does not have to be transmitted to a different server.

Conversely, if a person, here a person 200', is recorded in the second area $B_2$, this information may also be relevant, for example, to the server 110' close to which, for example, a robot 210' may be located. It is in fact conceivable for the person 200' to be moving toward the robot 210' as indicated by an arrow. In this respect, it is appropriate to transmit this information to the server 110'.

It is also conceivable for the person 200' to be located at a later time in the area $B_3$. It can be concluded from this with a high degree of certainty that this person is moving toward the robot 210'.

On the whole, a very precise object map can be created in this way for a factory environment, on the basis of which a particularly safe and efficient operation is possible in this factory environment.

The invention claimed is:

1. A method for creating an object map for a factory environment using a plurality of sensors present in the factory environment, the method comprising:
    recording, with at least two sensors of the plurality of sensors, first information relating to a position of at least one part of a first object in the factory environment, the first information including information relating to a first area in the factory environment and to a second area in the factory environment, the second area being further removed from a reference point in the factory environment than the first area;
    recording, with at least one further sensor of the plurality of sensors, second information, the second information including information relating to the second area in the factory environment;
    transmitting the first information to a first server assigned to the at least two sensors, the first server being remote from the at least two sensors;
    transmitting the second information to a second server assigned to the at least one further sensor, the second server being remote from the at least one further sensor;

forwarding, from the first server to the second server, a portion of the first information relating to the second area;

creating, with the first server, a first partial object map of the first area for the factory environment based on the first information;

creating, with the second server, a second partial object map of the second area for the factory environment based on the second information and the portion of the first information relating to the second area; and creating the object map for the factory environment with the position of the at least one part of the first object, based on the first partial object map and the second partial object map.

2. The method as claimed in claim 1, the recording further comprising:

recording, with each of the plurality of sensors, the at least one part of the first object in the factory environment.

3. The method as claimed in claim 1 further comprising: transmitting the object map to at least one device present in the factory environment.

4. The method as claimed in claim 3 further comprising: controlling the at least one device present in the factory environment based on the object map.

5. The method as claimed in claim 1, the creating further comprising:

creating the object map with the first server.

6. The method as claimed in claim 1, wherein the second information relates to a position of at least one part of a second object in the factory environment, the creating the object map further comprising:

creating the object map for the factory environment from the first partial object map and the second partial object map with the position of the at least one part of the first object and the position of the at least one part of the second object.

7. The method as claimed in claim 1, further comprising: transmitting the first partial object map to a higher-order server from the first server;

transmitting the second partial object map to the higher-order server from the second server; and creating the object map with the higher-order server.

8. The method as claimed in claim 1, wherein the plurality of sensors include at least one of cameras, video cameras, stereo cameras, ultrasound sensors, microphones, proximity sensors, RADAR units, LIDAR units, radio modules, WLAN units, Bluetooth units, inertial sensors, and distance sensors.

9. The method as claimed in claim 1, wherein the plurality of sensors include at least some sensors which are disposed on at least one of objects and devices in the factory environment.

10. A system for creating an object map for a factory environment, the system comprising:

a plurality of sensors present in the factory environment, at least two sensors of the plurality of sensors being configured to record first information relating to a position of at least one part of a first object in the factory environment, the first information including information relating to a first area in the factory environment and to a second area in the factory environment, the second area being further removed from a reference point in the factory environment than the first area, at least one further sensor of the plurality of sensors being configured to record second information, the second information including information relating to the second area in the factory environment;

a first server assigned to the at least two sensors, the first server being configured to (i) receive the first information, (ii) create a first partial object map for the first area of the factory environment based on the first information, and (iii) forward a second server, a portion of the first information relating to the second area, the first server being remote from the at least two sensors; and the second server assigned to the at least one further sensor, the second server being configured to (i) receive the second information and (ii) create a second partial object map for the second area of the factory environment based on the second information and the portion of the first information relating to the second area, the second server being remote from the at least one further sensor, wherein the object map for the factory environment is created with the position of the at least one part of the first object, based on the first partial object map and the second partial object map.

11. A non-transitory computer program for creating an object map for a factory environment using a plurality of sensors present in the factory environment, the computer program being configured to, when executed, cause a system to:

record, with at least two sensors of a plurality of sensors of the system, first information relating to a position of at least one part of a first object in the factory environment, the first information including information relating to a first area in the factory environment and to a second area in the factory environment, the second area being further removed from a reference point in the factory environment than the first area;

record, with at least one further sensor of the plurality of sensors, second information, the second information including information relating to the second area in the factory environment;

transmit the first information to a first server of the system assigned to the at least two sensors, the first server being remote from the at least two sensors;

transmit the second information to a second server assigned to the at least one further sensor, the second server being remote from the at least one further sensor;

forward, from the first server to the second server, a portion of the first information relating to the second area;

create, with the first server, a first partial object map of the first area for the factory environment based on the first information;

create, with the second server, a second partial object map of the second area for the factory environment based on the second information and the portion of the first information relating to the second area; and create the object map for the factory environment with the position of the at least one part of the first object, based on the first partial object map and the second partial object map.

12. The non-transitory computer program as claimed in claim 11, wherein the computer program is stored on a non-transitory machine-readable storage medium.

* * * * *